United States Patent
Zhou

(10) Patent No.: US 12,438,390 B2
(45) Date of Patent: Oct. 7, 2025

(54) POWER SYSTEM AND METHOD FOR ADJUSTING A RELEASE VOLTAGE OF A BI-DIRECTIONAL CONVERTER

(71) Applicant: Chengdu Monolithic Power Systems Co., Ltd., Chengdu (CN)

(72) Inventor: Yong Zhou, Chengdu (CN)

(73) Assignee: Chengdu Monolithic Power Systems Co., Ltd., Sichuan (CN)

( * ) Notice: Subject to any disclaimer, the term of this patent is extended or adjusted under 35 U.S.C. 154(b) by 0 days.

(21) Appl. No.: 18/466,310

(22) Filed: Sep. 13, 2023

(65) Prior Publication Data
US 2023/0420978 A1 Dec. 28, 2023

Related U.S. Application Data

(63) Continuation of application No. 17/384,952, filed on Jul. 26, 2021, now Pat. No. 11,799,314.

(30) Foreign Application Priority Data

Aug. 13, 2020 (CN) .......................... 202010815729.X

(51) Int. Cl.
H02J 7/34 (2006.01)
H02J 1/08 (2006.01)

(52) U.S. Cl.
CPC .............. *H02J 7/345* (2013.01); *H02J 1/082* (2020.01)

(58) Field of Classification Search
CPC .......... H02J 7/345; H02J 1/082; H02J 7/0013; H02J 7/34; H02J 2207/50

USPC .......................................................... 307/31
See application file for complete search history.

(56) References Cited

U.S. PATENT DOCUMENTS

| | | | |
|---|---|---|---|
| 8,643,351 B2 | 2/2014 | Lai et al. | |
| 8,693,276 B2 | 4/2014 | Lai et al. | |
| 2009/0108677 A1 | 4/2009 | Walter et al. | |
| 2017/0317503 A1* | 11/2017 | Ohashi | H02S 10/20 |
| 2018/0091056 A1 | 3/2018 | Reddiconto et al. | |
| 2022/0052547 A1 | 2/2022 | Zhou | |

FOREIGN PATENT DOCUMENTS

| | | |
|---|---|---|
| CN | 102158080 A | 8/2011 |
| CN | 102981482 A | 3/2013 |
| CN | 103066835 A | 4/2013 |
| CN | 104578800 A | 4/2015 |
| CN | 106484021 A | 3/2017 |

(Continued)

*Primary Examiner* — Richard Tan
(74) *Attorney, Agent, or Firm* — Perkins Coie LLP

(57) ABSTRACT

A power system having a power input terminal adapted to receive a bus voltage and a sense terminal adapted to receive a sense voltage indicative of the bus voltage. The power system may further include a bi-directional converter having a first terminal and a second terminal. The first terminal of the bi-directional converter may be coupled to the power input terminal. In an embodiment, when the sense voltage is decreased to reach or to be lower than the reference voltage, the bi-directional converter may be adapted to be configured to operate in a release mode to provide a release voltage at the first terminal. The release voltage may vary in accordance with varying in a transition voltage threshold that is a voltage value of the bus voltage at a moment when the sense voltage decreases to reach the reference voltage.

27 Claims, 10 Drawing Sheets

(56) References Cited

FOREIGN PATENT DOCUMENTS

| | | | |
|---|---|---|---|
| CN | 106655747 | A | 5/2017 |
| CN | 107147206 | A | 9/2017 |
| CN | 107834517 | A | 3/2018 |
| JP | 2019193517 | A | 10/2019 |

\* cited by examiner

| Voltage Region | Transition Voltage Digital Signal $D_{UV}$ | Output Control Signal VO |
|---|---|---|
| RG1 | D1 | VO1 |
| RG2 | D2 | VO2 |
| RG3 | D3 | VO3 |
| RG4 | D4 | VO4 |
| RG5 | D5 | VO5 |
| RG6 | D6 | VO6 |
| RG7 | D7 | VO7 |
| RG8 | D8 | VO8 |

| Voltage Region | Transition Voltage Digital Signal $D_{UV}$ | High Side Control Signal VH | Low Side Control Signal VL |
|---|---|---|---|
| RG1 | D1 | VH1 | VL1 |
| RG2 | D2 | VH2 | VL2 |
| RG3 | D3 | VH3 | VL3 |
| RG4 | D4 | VH4 | VL4 |
| RG5 | D5 | VH5 | VL5 |
| RG6 | D6 | VH6 | VL6 |
| RG7 | D7 | VH7 | VL7 |
| RG8 | D8 | VH8 | VL8 |

Fig. 5

POWER SYSTEM AND METHOD FOR ADJUSTING A RELEASE VOLTAGE OF A BI-DIRECTIONAL CONVERTER

CROSS-REFERENCE TO RELATED APPLICATIONS

The present application is a continuation of U.S. patent application Ser. No. 17/384,952, filed on Jul. 26, 2021, which claims the benefit of Chinese Patent Application No. 202010815729.X, filed on Aug. 13, 2020 and is incorporated herein by reference in its entirety.

TECHNICAL FIELD

This disclosure relates generally to a power system, and more particularly but not exclusively relates to a power system having a bi-directional converter.

BACKGROUND

Nowadays, bi-directional converters are widely used in uninterruptable power applications. When there is a power source for the bi-directional converter in a power system, the bi-directional converter works in a first mode to transfer energy from the power source to a storage capacitor. When there is no power source, the bi-directional converter works in a second mode to provide a release voltage as a backup power supply for the power system.

For one bi-directional converter, the release voltage is supposed to be adjustable to meet different application requirements. Usually the release voltage is adjusted through some dedicated communication pins (such as I2C pin(s)) or a feedback pin of the bi-directional converter, but if the release voltage can be adjusted without such a dedicated pin, the cost of the bi-directional converter will be decreased.

Therefore, it is desired to design a bi-directional converter that can adjust the release voltage without an extra-dedicated pin.

SUMMARY

There has been provided, in accordance with an embodiment of the present disclosure, a power system. The power system may have a power input terminal adapted to receive a bus voltage and a sense terminal adapted to receive a sense voltage indicative of the bus voltage. The power system may further include a bi-directional converter having a first terminal and a second terminal. The first terminal of the bi-directional converter may be coupled to the power input terminal. In an embodiment, when the sense voltage is decreased to reach or to be lower than the reference voltage, the bi-directional converter may be adapted to be configured to operate in a release mode to provide a release voltage at the first terminal. The release voltage may vary in accordance with varying in a transition voltage threshold that is a voltage value of the bus voltage at a moment when the sense voltage decreases to reach the reference voltage.

In accordance with an embodiment, the release voltage increases when the transition voltage threshold increases. In an embodiment, the release voltage decreases when the transition voltage threshold decreases.

In accordance with an alternative embodiment of the present disclosure, the transition voltage threshold may be a voltage value of the bus voltage at a moment when the bi-directional converter enters the release mode.

BRIEF DESCRIPTION OF DRAWINGS

The following detailed description of various embodiments of the present invention can best be understood when read in conjunction with the following drawings, in which the features are not necessarily drawn to scale but rather are drawn as to best illustrate the pertinent features.

FIG. 5 illustrates a diagram showing corresponding relations among the transition voltage regions RG1~RG8, the transition voltage digital signal $D_{UV}$ and the upper limit control signal VH and the lower limit control signal VL of the exemplary release voltage setting circuit of FIG. 3 in accordance with an embodiment of the present invention.

DETAILED DESCRIPTION

Figure 1:
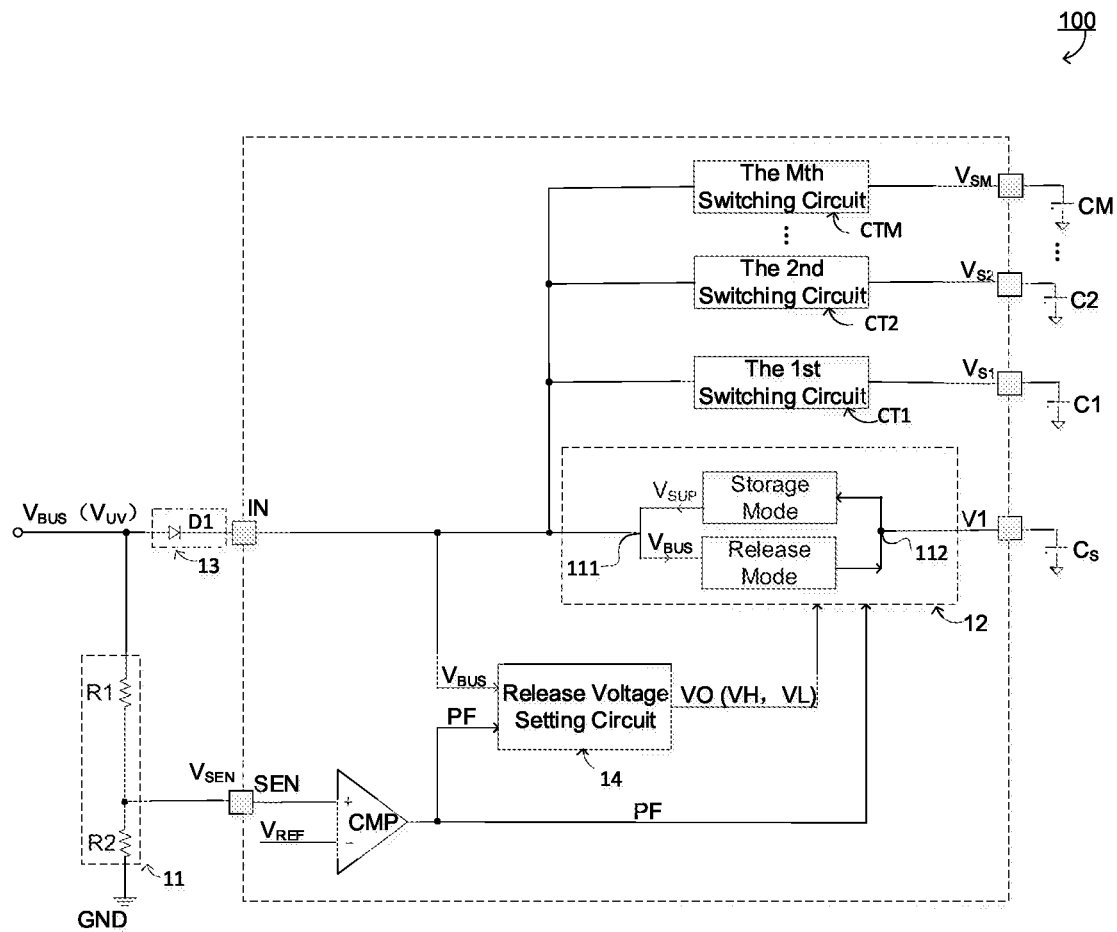
FIG. 1 illustrates a schematic diagram of a power system 100 in accordance with an embodiment of the present invention.

Various embodiments of the present invention will now be described. In the following description, some specific details, such as example circuits and example values for these circuit components, are included to provide a thorough understanding of embodiments. One skilled in the relevant art will recognize, however, that the present invention can be practiced without one or more specific details, or with other methods, components, materials, etc. In other instances, well-known structures, materials, processes or operations are not shown or described in detail to avoid obscuring aspects of the present invention.

Throughout the specification and claims, the terms "left," "right," "in," "out," "front," "back," "up," "down, "top," "atop", "bottom," "over," "under," "above," "below" and the like, if any, are used for descriptive purposes and not necessarily for describing permanent relative positions. It is to be understood that the terms so used are interchangeable under appropriate circumstances such that embodiments of the technology described herein are, for example, capable of operation in other orientations than those illustrated or otherwise described herein. The term "coupled," as used herein, is defined as directly or indirectly connected in an electrical or non-electrical manner. The terms "a," "an," and "the" includes plural reference, and the term "in" includes "in" and "on". The phrase "in one embodiment," as used herein does not necessarily refer to the same embodiment, although it may. The term "or" is an inclusive "or" operator, and is equivalent to the term "and/or" herein, unless the context clearly dictates otherwise. Where either a field effect transistor ("FET") or a bipolar junction transistor ("BJT") may be employed as an embodiment of a transistor, the scope of the words "gate", "drain", and "source" includes "base", "collector", and "emitter", respectively, and vice versa. Those skilled in the art should understand that the meanings of the terms identified above do not necessarily limit the terms, but merely provide illustrative examples for the terms.

The terms "comprise", "include", "have" and any variations thereof, are intended to cover non-exclusive inclusions, such that a process, method, article, or apparatus that comprises a list of elements is not necessarily limited to those elements, but may include other elements not expressly listed or inherent to such process, method, article, or apparatus.

For convenience of explanation, the present disclosure takes a lateral asymmetric transistor manufactured on and/or in semiconductor substrates for example for the explanation, but this is not intended to be limiting and persons of ordinary skill in the art will understand that the structure and principles taught herein also apply to other types of semiconductor materials and devices as well. While poly-silicon is preferred for forming the gate of the transistors used in embodiments of the present disclosure, the embodiments are not limited to this choice of conductor, and other types of materials (e.g., metals, other semiconductors, semi-metals, and/or combinations thereof) that are compatible with other aspects of the device manufacturing process may be used.

FIG. 1 illustrates a schematic diagram of a power system 100 in accordance with an embodiment of the present invention. The power system 100 may include a power input terminal IN to receive a bus voltage $V_{BUS}$, a feedback circuit 11 and a bi-directional converter 12. The feedback circuit 11 receives the bus voltage $V_{BUS}$ and generates a sense voltage $V_{SEN}$ at a sense terminal SEN indicative of the bus voltage $V_{BUS}$. The bi-directional converter 12 has a first terminal 111 coupled to the power input terminal IN and a second terminal 112 coupled to a storage capacitance $C_S$. The bi-directional converter 12 can work in a storage mode or a release mode based on the sense voltage $V_{SEN}$. When the sense voltage $V_{SEN}$ is higher than a reference voltage $V_{REF}$, the bi-directional converter 12 works in the storage mode, the bi-directional converter 12 converts the bus voltage $V_{BUS}$ received at the first terminal 111 to a first voltage V1 at the second terminal 112 to charge the storage capacitance $C_S$. When the sense voltage $V_{SEN}$ is lower than the reference voltage $V_{REF}$, the bi-directional converter 12 works in the release mode, the bi-directional converter 12 converts the first voltage V1 at the second terminal 112 to a release voltage $V_{SUP}$ at the first terminal 111, wherein the bus voltage $V_{BUS}$ at the moment when the bi-directional converter 12 transits from the storage mode to the release mode is defined as a transition voltage threshold $V_{UV}$. The transition voltage threshold $V_{UV}$ is adjusted by the feedback circuit 11, and the release voltage $V_{SUP}$ can be adjusted by the transition voltage threshold $V_{UV}$. In an embodiment, the first voltage V1 is lower than the bus voltage $V_{BUS}$. In another embodiment, the release voltage $V_{SUP}$ is higher than the first voltage V1. In an embodiment, the bi-directional converter 12 may include a converter circuit which can be configured as a buck circuit working for the storage mode or a boost circuit working for the release mode. In the exemplary embodiment of FIG. 1, the power system 100 may further comprise M switching circuits CT1, CT2, ..., CTM for providing M output voltages $V_{S1}$, $V_{S2}$, ..., $V_{SM}$ respectively, wherein M is an integer greater than or equal to 1. Each switching circuit has an input terminal coupled to the first terminal 111 of the bi-directional converter 12 to receive the bus voltage $V_{BUS}$ or the release voltage $V_{SUP}$, and an output terminal to output the responding output voltage. In an embodiment, the M output voltages $V_{S1}$, $V_{S2}$, ..., $V_{SM}$ may have different values to meet specific requirements. In the exemplary embodiment of FIG. 1, the power system 100 may further comprise M switching capacitors C1, C2, ..., CM, wherein the $i^{th}$ switching capacitor Ci is coupled to the output terminal of the $i^{th}$ switching circuit CTi for receiving the $i^{th}$ output voltage $V_{Si}$, wherein i is an integer from 1 to M. When the sense voltage $V_{SEN}$ is higher than the reference voltage $V_{REF}$, the bi-directional converter 12 works in the storage mode, the M switching circuits CT1, CT2, ..., CTM are powered by the bus voltage $V_{BUS}$ received from the power input terminal IN. When the sense voltage $V_{SEN}$ is lower than the reference voltage $V_{REF}$, the bi-directional converter 12 works in the release mode to provide the release voltage $V_{SUP}$, and the M switching circuits CT1, CT2, ..., CTM are powered by the release voltage $V_{SUP}$. In an embodiment, one or some of the M switching circuits CT1, CT2, ..., CTM can be fabricated in the same semiconductor substrate making of the bi-directional converter 12.

In the exemplary embodiment of FIG. 1, the feedback circuit 11 may include a first resistor R1 and a second resistor R2, wherein the first resistor R1 has a first terminal coupled to the power input terminal IN to receive the bus voltage $V_{BUS}$, and a second terminal coupled to the sense terminal SEN. The second resistor R2 has a first terminal coupled to the sense terminal SEN, and a second terminal coupled to a reference ground GND. The transition voltage threshold $V_{UV}$ can be adjusted by changing the ratio of the first resistor R1 to the second resistor R2.

The exemplary power system 100 may further comprise a mode control circuit CMP. The mode control circuit CMP receives the sense voltage $V_{SEN}$ from the sense terminal SEN and generates a mode signal PF by comparing the sense voltage $V_{SEN}$ with the reference voltage $V_{REF}$. When the sense voltage $V_{SEN}$ is higher than the reference voltage $V_{REF}$, the mode signal PF is in a first state to control the bi-directional converter 12 to work in the storage mode. When the sense voltage $V_{SEN}$ is lower than the reference voltage $V_{REF}$, the mode signal PF is in a second state to control the bi-directional converter 12 to work in the release mode.

Still referring to FIG. 1, the power system 100 may further comprise a protection circuit 13. When the sense voltage $V_{SEN}$ is higher than the reference voltage $V_{REF}$, the protection circuit 13 can be seen as a conductive line, the bus voltage $V_{BUS}$ transits to the power input terminal IN through the protection circuit 13. When the sense voltage $V_{SEN}$ is lower than the reference voltage $V_{REF}$, the protection circuit 13 may block a reverse current coming from the power input terminal IN. Persons with ordinary skills in this art should know that the protection circuit 13 may be integrated with the bi-directional converter 12 in the same semiconductor substrate. The protection circuit 13 can also be realized by discrete devices, such as a discrete diode D1 illustrated in FIG. 1. In an embodiment, the protection circuit 13 may include a MOSFET.

Continuing with FIG. 1, the power system 100 further may include a release voltage setting circuit 14. The release voltage setting circuit 14 receives the bus voltage $V_{BUS}$ and the mode signal PF, and records the bus voltage $V_{BUS}$ at the moment when the mode signal PF transits from the first state to the second state, i.e., the release voltage setting circuit 14 records the transition voltage threshold $V_{UV}$. The release voltage setting circuit 14 further generates an output control signal VO based on the transition voltage threshold $V_{UV}$ to control the release voltage $V_{SUP}$. In an embodiment, the release voltage setting circuit 14 is configured to generate a high side control signal VH and a low side control signal VL based on the transition voltage threshold $V_{UV}$ to control the release voltage $V_{SUP}$. In an embodiment, the release voltage $V_{SUP}$ equals the average value of the high side control signal VH and the low side control signal VL. In an embodiment, the high side control signal VH is fixed. In an embodiment, when the transition voltage threshold $V_{UV}$ increases, the release voltage $V_{SUP}$ increases. In an embodiment, when the transition voltage threshold $V_{UV}$ increases, the release voltage $V_{SUP}$ decreases.

Figure 2:
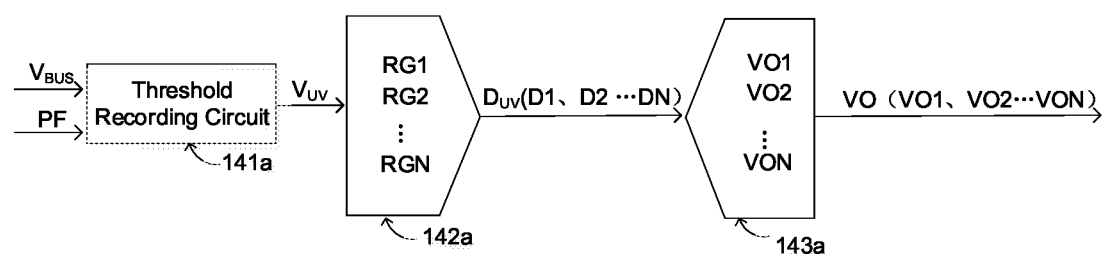
FIG. 2 illustrates a schematic diagram of an exemplary release voltage setting circuit that may be used as the release voltage setting circuit 14 of FIG. 1 in accordance with an embodiment of the present invention.

FIG. 2 illustrates a schematic diagram of an exemplary release voltage setting circuit that may be used as the release voltage setting circuit 14 of FIG. 1 in accordance with an embodiment of the present invention. In the exemplary embodiment of FIG. 2, the release voltage setting circuit 14 may include a threshold recording circuit 141a, a coding circuit 142a and a decoding circuit 143a. The threshold recording circuit 141a is configured to generate the transition voltage threshold $V_{UV}$ based on the bus voltage $V_{BUS}$ and the mode signal PF. The coding circuit 142a receives the transition voltage threshold $V_{UV}$ and generates a transition voltage digital signal $D_{UV}$ based on the transition voltage threshold $V_{UV}$. In an embodiment, the transition voltage digital signal $D_{UV}$ is generated by coding the transition voltage threshold $V_{UV}$ according to a predetermined coding rule. The decoding circuit 143a receives the transition voltage digital signal $D_{UV}$ and generates the output control signal VO based on the transition voltage digital signal $D_{UV}$ to control the release voltage $V_{SUP}$. In an embodiment, the output control signal VO is generated by decoding the transition voltage digital signal $D_{UV}$ according to a predetermined decoding rule. The working principle of the coding circuit 142a and the decoding circuit 143a will be described together for better understanding. For the coding circuit 142a, N voltage regions RG1, RG2, . . . , RGN are programmed in it and the transition voltage threshold $V_{UV}$ is in one of the N voltage regions RG1, RG2, . . . , RGN. The transition voltage digital signal $D_{UV}$ may have N coding values D1, D2, . . . , DN in response to the N voltage regions RG1, RG2, . . . , RGN respectively, and the output control signal VO has N decoding values VO1, VO2, . . . , VON in response to the N coding values D1, D2, . . . , DN respectively, wherein N is an integer greater than 1 and is determined by the bit of the coding circuit 142a. When the transition voltage threshold $V_{UV}$ is in one voltage region, the transition voltage digital signal $D_{UV}$ may have a corresponding coding value and the output control signal VO may have a corresponding decoding value accordingly. For example, if the transition voltage threshold $V_{UV}$ is in the $i^{th}$ voltage region RGi, the transition voltage digital signal $D_{UV}$ may have the $i^{th}$ coding value Di, and the output control signal VO may have the $i^{th}$ decoding value VOi, wherein i is an integer from 1 to N.

Figures 3, 4:
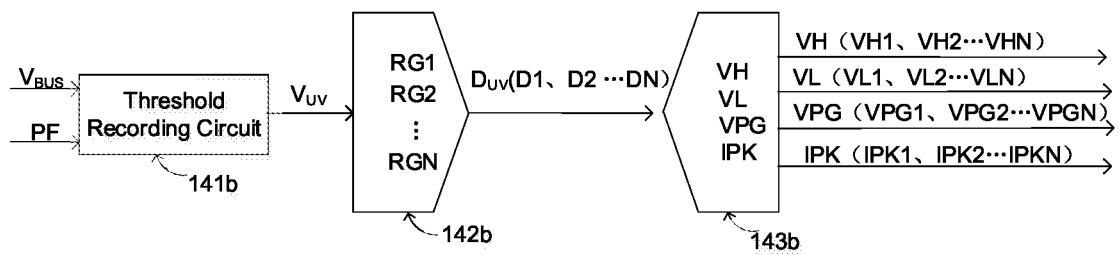
FIG. 3 illustrates a schematic diagram of another exemplary release voltage setting circuit that may be used as the release voltage setting circuit 14 of FIG. 1 in accordance with an alternative embodiment of the present invention.
FIG. 4 illustrates a diagram showing corresponding relations among the transition voltage regions RG1~RG8, the transition voltage digital signal $D_{UV}$ and the output control signal VO of the exemplary release voltage setting circuit of FIG. 2 in accordance with an embodiment of the present invention.

FIG. 3 illustrates another schematic diagram of the release voltage setting circuit 14 in accordance with an embodiment of the present invention. In the exemplary embodiment of FIG. 3, the release voltage setting circuit 14 may include a threshold recording circuit 141b, a coding circuit 142b and a decoding circuit 143b. The threshold recording circuit 141b receives the bus voltage $V_{BUS}$ and the mode signal PF, and is configured to record the transition voltage threshold $V_{UV}$. The coding circuit 142b receives the transition voltage threshold $V_{UV}$ and generates the transition voltage digital signal $D_{UV}$ based on the transition voltage threshold $V_{UV}$. In an embodiment, the transition voltage digital signal $D_{UV}$ is generated by coding the transition voltage threshold $V_{UV}$ according to a predetermined code rule. The decoding circuit 143b receives the transition voltage digital signal $D_{UV}$ from the coding circuit 142b and generates the high side control signal VH and the low side control signal VL based on the transition voltage digital signal $D_{UV}$ to control the release voltage $V_{SUP}$. In an embodiment, the high side control signal VH and the low side control signal VL are generated by decoding the transition voltage digital signal $D_{UV}$ according to a predetermined decoding rule. The working principle of the coding circuit 142b and the decoding circuit 143b will be described together for better understanding. For the coding circuit 142b, N voltage regions RG1, RG2, . . . , RGN are programmed in it and the transition voltage threshold $V_{UV}$ is in one of the N voltage regions RG1, RG2, . . . , RGN. The transition voltage digital signal $D_{UV}$ may have N coding values D1, D2, . . . , DN in response to the N voltage regions RG1, RG2, . . . , RGN respectively, the high side control signal VH has N high side values VH1, VH2, . . . , VHN in response to the N coding values D1, D2, . . . , DN respectively, and the low side control signal VL has N low side values VL1, VL2, . . . , VLN in response to the N coding values D1, D2, . . . , DN respectively, wherein N is an integer greater than 1 and is determined by the bit of the coding circuit 142b. In an embodiment, the release voltage $V_{SUP}$ equals the average value of the high side control signal VH and the low-side control signal VL. In another embodiment, the high side control signal VH is fixed, i.e., VH1= VH2= . . . VHN. In the exemplary embodiment of FIG. 3, the decoding circuit 143b may further generate an indication signal VPG based on the transition voltage digital signal $D_{UV}$. The indication signal VPG has N indication values VPG1, VPG2, . . . , VPGN in response to the N coding values D1, D2, . . . , DN respectively. In other embodiments, the decoding circuit 143b further generates a current peak signal IPK to control the current limit of the bi-directional converter 12, the current peak signal IPK has N current values IPK1, IPK2, . . . , IPKN in response to the N coding values D1, D2, . . . , DN respectively. In an embodiment, the decoding circuit 143b may further generate a plurality of analogy control signals configured to control some electric parameters of the bi-directional converter 12, wherein one or some of the plurality of analogy control signals may be configured to control one electric parameter of the bi-directional converter 12.

FIG. 4 illustrates a sheet showing the corresponding relation between the transition voltage digital signal $D_{UV}$ and the output control signal VO of the release voltage setting circuit 14 of FIG. 2 in accordance with an embodiment of the present invention. Assuming the coding circuit 142a and the decoding circuit 143a are 3 bits, so voltage regions RG1, RG2, . . . , RG8 are programmed in the coding circuit 142a. If the transition voltage threshold $V_{UV}$ is in the first voltage region RG1, the transition voltage digital signal $D_{UV}$ has a first coding value D1, and the output control signal VO has a first decoding value VOL. The transition voltage threshold $V_{UV}$ is adjustable, for example, when the transition voltage threshold $V_{UV}$ is changed from the first voltage region RG1 to the second voltage region RG2, the transition voltage digital signal $D_{UV}$ is changed from the first coding value D1 to the second coding value D2, and the output control signal VO is changed from the first decoding value VO1 to the second decoding value VO2 accordingly.

FIG. 5 illustrates a sheet showing the corresponding relation among the transition voltage digital signal $D_{UV}$, the high side control signal VH and the low side control signal VL of the release voltage setting circuit 14 of FIG. 3 in accordance with an embodiment of the present invention. Assuming the coding circuit 142b and the decoding circuit 143b are 3 bits, so voltage regions RG1, RG2, ..., RG8 are programmed in the coding circuit 142b. If the transition voltage threshold $V_{UV}$ is in the first voltage region RG1, the transition voltage digital signal $D_{UV}$ has a first coding value D1, the high side control signal VH has a first high side value VH1, and the low side control signal VL has a first low side value VL1. The transition voltage threshold $V_{UV}$ is adjustable, for example, when the transition voltage threshold $V_{UV}$ is changed from the first voltage region RG1 to the second voltage region RG2, the transition voltage digital signal $D_{UV}$ is changed from the first coding value D1 to the second coding value D2, the high side control signal VH is changed from the first high side value VH1 to the second high side value VH2, and the low side control signal VL is changed from the first low side value VL1 to the second low side value VL2 accordingly.

Persons with ordinary skills in this art should know that the adjusting accuracy of the release voltage $V_{SUP}$ can be improved if the coding circuit and decoding circuit have more bits.

Figure 6A:
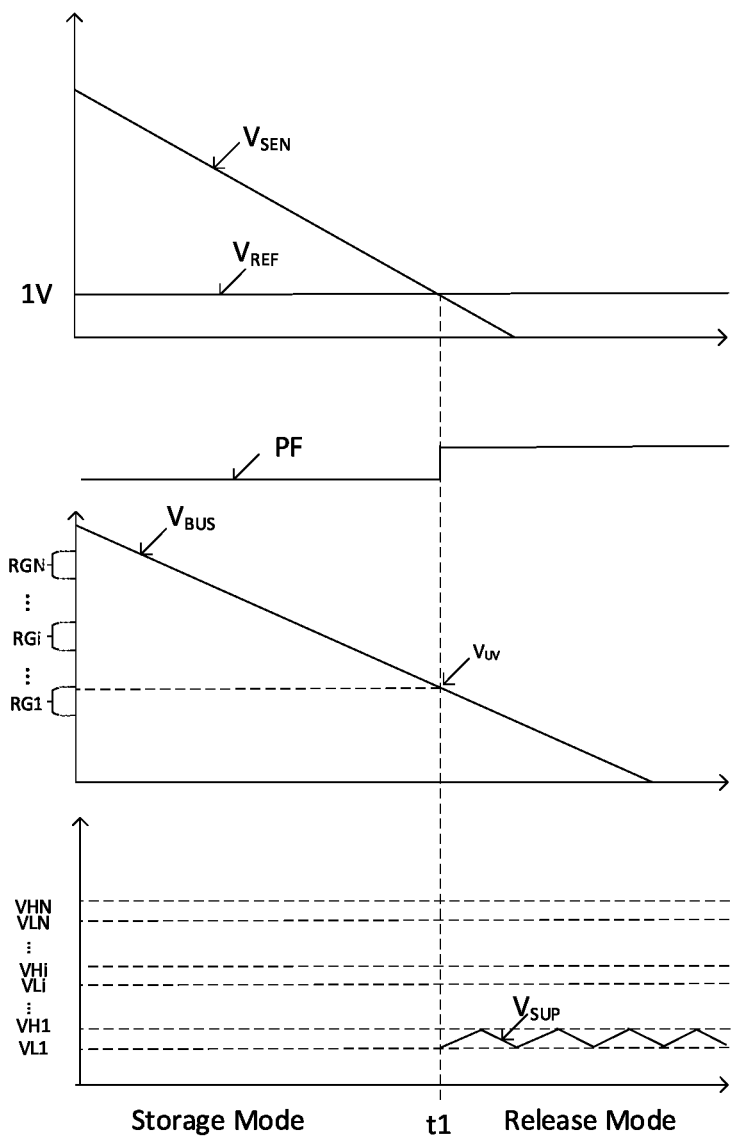
FIG. 6A-FIG. 6C illustrate the variation of the release voltage $V_{SUP}$ when the transition voltage threshold $V_{UV}$ increases in accordance with an embodiment of the present invention.
Figure 6B:
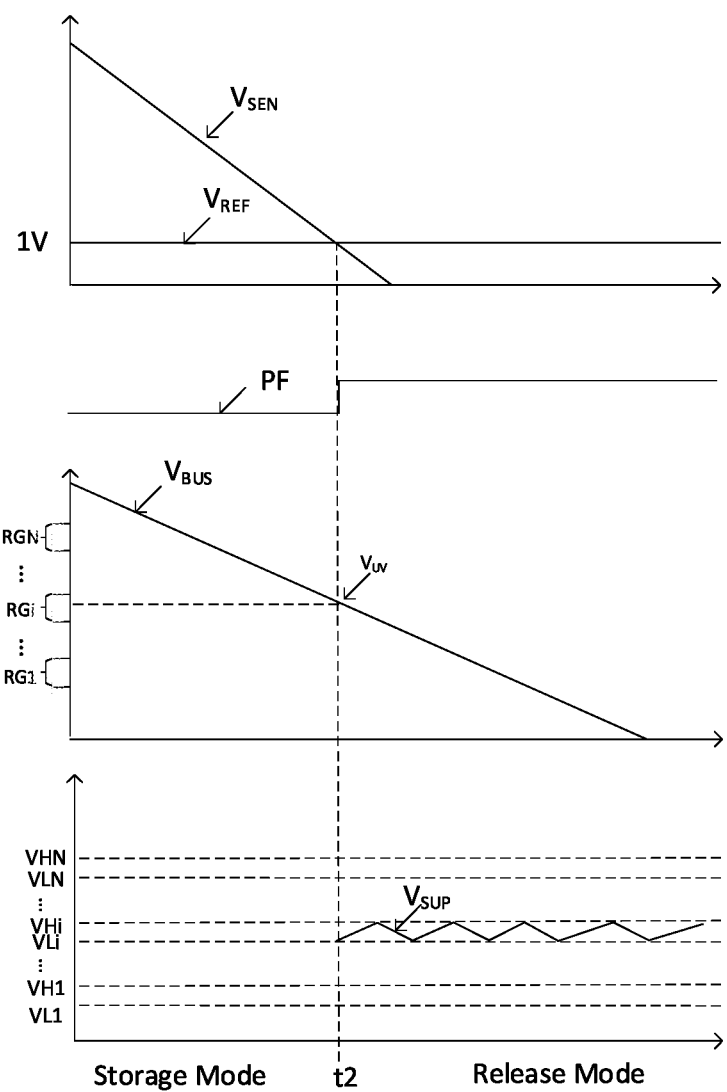
Figure 6C:
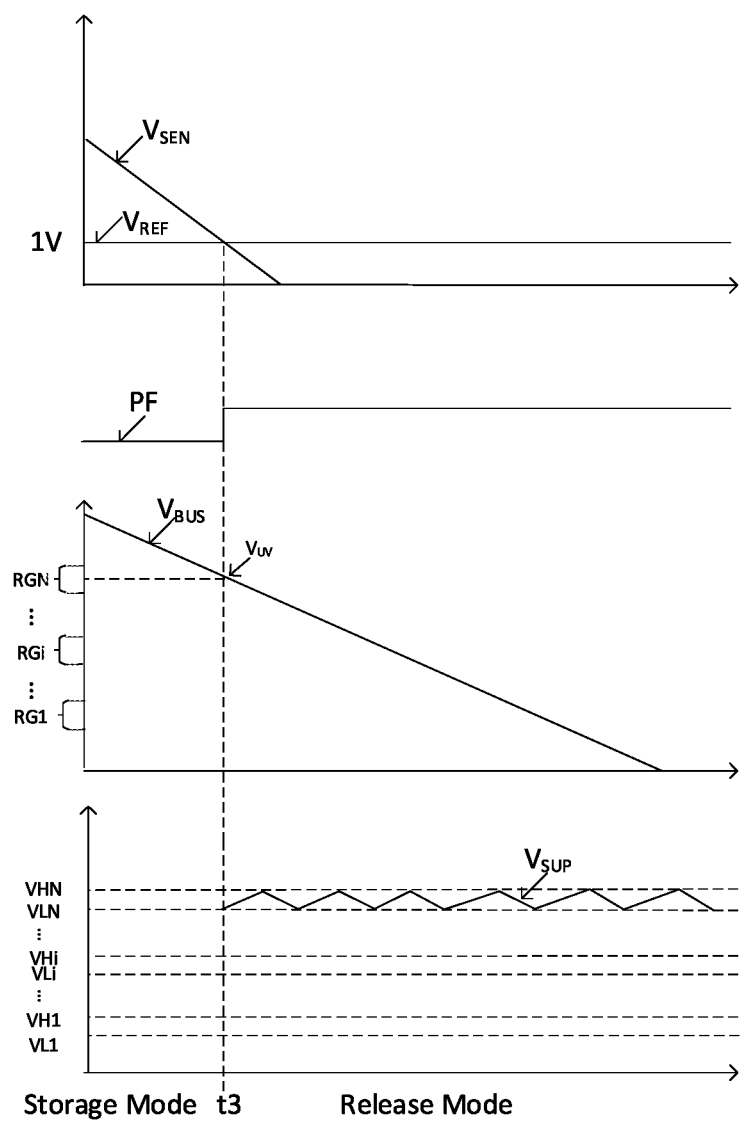

FIG. 6A-FIG. 6C illustrate the variation of the release voltage $V_{SUP}$ when the transition voltage threshold $V_{UV}$ increases in accordance with an embodiment of the present invention. The waveforms of the sense signal $V_{SEN}$, the reference voltage $V_{REF}$, the mode signal PF, the bus voltage $V_{BUS}$ and the release voltage $V_{SUP}$ are all shown with reference for better illustration. Assuming the reference voltage $V_{REF}$ is 1V, when the bus voltage $V_{BUS}$ decreases, the sense voltage $V_{SEN}$ decreases. The sense voltage $V_{SEN}$ drops to the reference voltage $V_{REF}$ at the moment t1, so the mode signal PF transits from the first state to the second state and the bi-directional converter 12 transits from the storage mode to the release mode for providing the release voltage $V_{SUP}$ at the moment t1. In FIG. 6A, the transition voltage threshold $V_{UV}$ is in the first voltage region RG1, thus the high side control signal VH equals the first high side value VH1, and the low side control signal VL equals the first low side value VL1. The release voltage $V_{SUP}$ equals the average value of the high side control signal VH and the low side control signal, i.e., $V_{SUP}=(VH+VL)/2=(VH1+VL1)/2$. In the exemplary embodiment of FIG. 6A, the bi-directional converter 12 working in the release mode is a boost circuit having a first power switch and a second power switch, and the release voltage $V_{SUP}$ is regulated by controlling the on and off switching of the first power switch and the second power switch.

In FIG. 6B, the transition voltage threshold $V_{UV}$ is increased to the $i^{th}$ voltage region RGi by adjusting the ratio of the first resistor R1 to the second resistor R2. For example, the ratio of the first resistor R1 to the second resistor R2 can be adjusted by changing the resistance of the first resistor R1 or the resistance of the second resistor R2. At the moment t2, the sense voltage $V_{SEN}$ drops to the reference voltage $V_{REF}$, so the mode signal PF transits from the first state to the second state and the bi-directional converter 12 transits from the storage mode to the release mode for providing the release voltage $V_{SUP}$. The bus voltage $V_{BUS}$ at the moment t2 is the transition voltage threshold $V_{UV}$, and the transition voltage threshold $V_{UV}$ in FIG. 6B is increased to the $i^{th}$ voltage region RGi. In FIG. 6B, the transition voltage threshold $V_{UV}$ is in the $i^{th}$ voltage region RGi, the high side control signal VH equals the $i^{th}$ high side value VHi, the low side control signal VL equals the $i^{th}$ low side value VLi, and the release voltage $V_{SUP}$ equals the average value of the high side control signal VH and the low side control signal VL, i.e., $$V_{SUP}=(VH+VL)/2=(VHi+VLi)/2.$$

In FIG. 6C, the transition voltage threshold $V_{UV}$ is increased to the $N^{th}$ voltage region RGN by adjusting the ratio of the first resistor R1 to the second resistor R2. For example, the ratio of the first resistor R1 to the second resistor R2 can be adjusted by changing the resistance of the first resistor R1 or the resistance of the second resistor R2. At the moment t3, the sense voltage $V_{SEN}$ drops to the reference voltage $V_{REF}$, so the mode signal PF transits from the first state to the second state and the bi-directional converter 12 transits from the storage mode to the release mode for providing the release voltage $V_{SUP}$. The bus voltage $V_{BUS}$ at the moment t3 is the transition voltage threshold $V_{UV}$, and the transition voltage threshold $V_{UV}$ in FIG. 6C is increased to the $N^{th}$ voltage region RGN. In FIG. 6C, the transition voltage threshold $V_{UV}$ is in the $N^{th}$ voltage region RGN, the high side control signal VH equals the $N^{th}$ high side value VHN, and the low side control signal VL equals the $N^{th}$ low side value VLN. The release voltage $V_{SUP}$ equals the average value of the high side control signal VH and the low side control signal VL, i.e., $$V_{SUP}=(VH+VL)/2=(VHN+VLN)/2.$$

It can be seen from FIG. 6A-FIG. 6C that the release voltage $V_{SUP}$ increases when the transition voltage threshold $V_{UV}$ varies. Specifically, when the transition voltage threshold $V_{UV}$ increases, the release voltage $V_{SUP}$ increases. In an embodiment, when the ratio of the first resistor R1 to the second resistor R2 increases, the transition voltage threshold $V_{UV}$ increases, and the release voltage $V_{SUP}$ increases accordingly. In another embodiment, when the ratio of the first resistor R1 to the second resistor R2 increases, the transition voltage threshold $V_{UV}$ decreases, and the release voltage $V_{SUP}$ decreases accordingly.

Figure 7A:
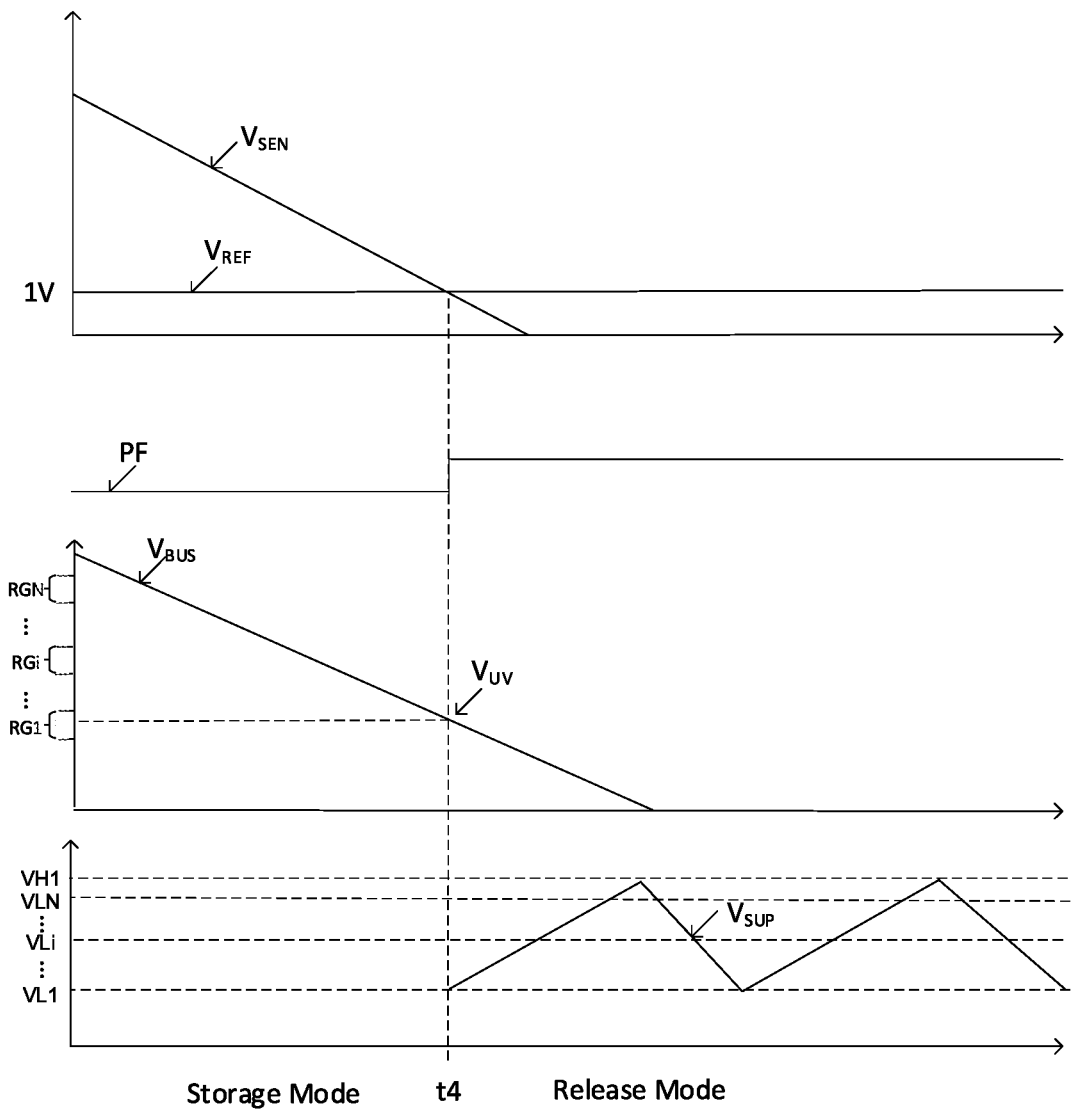
FIG. 7A-FIG. 7C illustrate the variation of the release voltage $V_{SUP}$ when the transition voltage threshold $V_{UV}$ increases in accordance with another embodiment of the present invention.
Figure 7B:
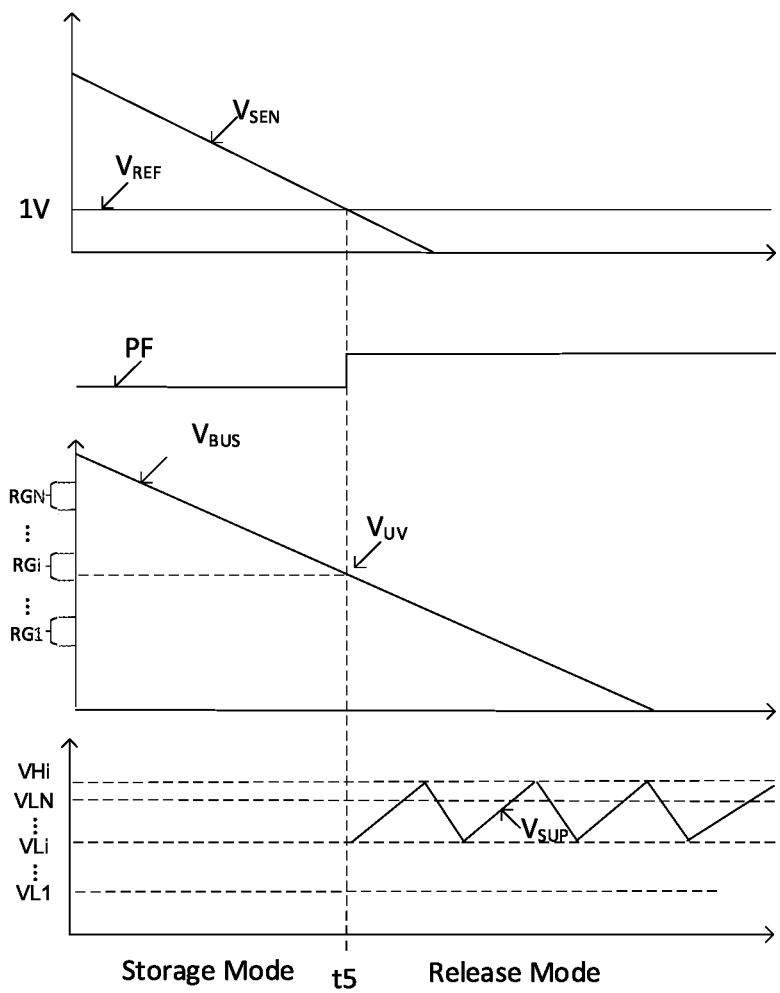
Figure 7C:
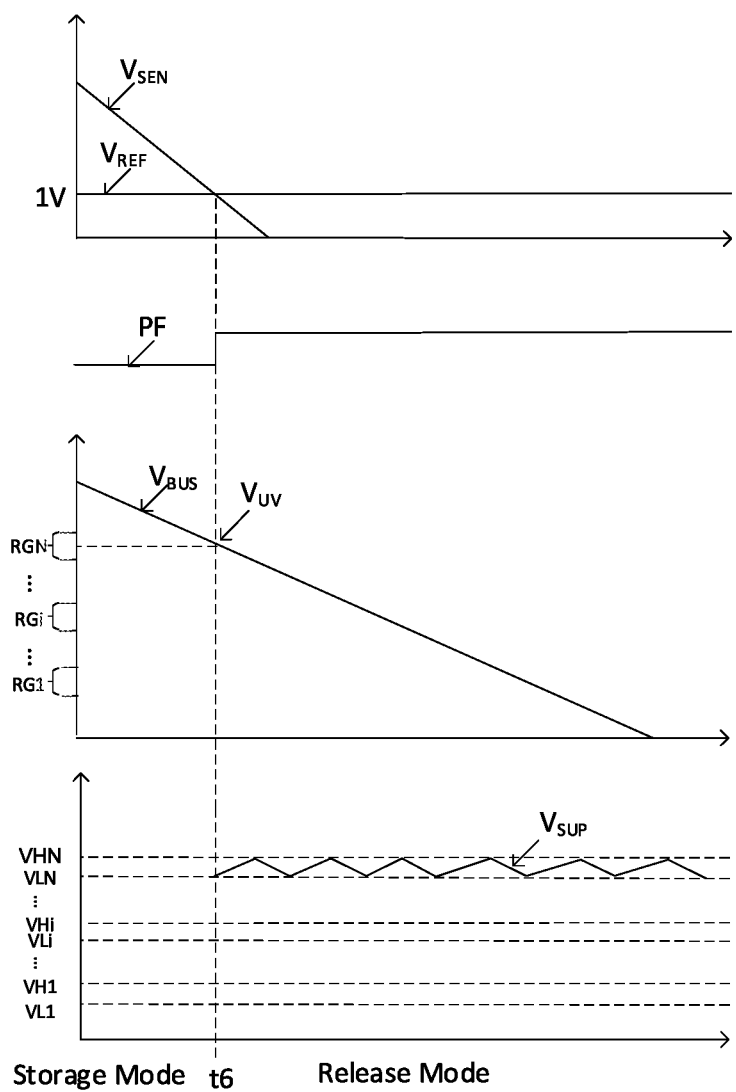

FIG. 7A-FIG. 7C illustrate the variation of the release voltage $V_{SUP}$ when the transition voltage threshold $V_{UV}$ is changed in accordance with another embodiment of the present invention. The waveforms of the sense voltage $V_{SEN}$, the reference voltage $V_{REF}$, the mode signal PF, the bus voltage $V_{BUS}$ and the release voltage $V_{SUP}$ are all shown for better illustration. The high side control signal VH of FIG. 7A-FIG. 7C is fixed, which is different from FIG. 6A-FIG. 6C. Assuming the reference voltage $V_{REF}$ is 1V, when the bus voltage $V_{BUS}$ decreases, the sense voltage $V_{SEN}$ decreases. The sense voltage $V_{SEN}$ drops to the reference voltage $V_{REF}$ at the moment t4, so the mode signal PF transits from the first state to the second state and the bi-directional converter 12 transits from the storage mode to the release mode for providing the release voltage $V_{SUP}$ at the moment t4, the value of the bus voltage $V_{BUS}$ at the moment t4 is the transition voltage threshold $V_{UV}$. In FIG. 7A, the transition voltage threshold $V_{UV}$ is in the first voltage region RG1, thus the high side control signal VH equals the first high side value VH1, and the low side control signal VL equals the first low side value VL1, the release voltage $V_{SUP}$ equals the average of the high side control signal VH and the low side control signal VL, i.e., $$V_{SUP}=(VH+VL)/2=(VH1+VL1)/2.$$

In FIG. 7B, the transition voltage threshold $V_{UV}$ is increased to the $i^{th}$ voltage region RGi by adjusting the ratio of the first resistor R1 to the second resistor R2. For example, the ratio of the first resistor R1 to the second resistor R2 can be adjusted by changing the resistance of the first resistor R1 or the resistance of the second resistor R2. At the moment t5, the sense voltage $V_{SEN}$ drops to the reference voltage $V_{REF}$, so the mode signal PF transits from the first state to the second state and the bi-directional converter 12 transits from the storage mode to the release mode for providing the release voltage $V_{SUP}$. The bus voltage $V_{BUS}$ at the moment t5 is the transition voltage threshold $V_{UV}$, so the transition voltage threshold $V_{UV}$ in FIG. 7B is increased to the $i^{th}$ voltage region RGi. In FIG. 7B, the transition voltage threshold $V_{UV}$ is in the $i^{th}$ voltage region RGi, the high side control signal VH equals the $i^{th}$ high side value VHi, the low side control signal VL equals the $i^{th}$ low side value VLi, and the release voltage $V_{SUP}$ equals the average value of the high side control signal VH and the low side control signal VL, i.e., $$V_{SUP}=(VH+VL)/2=(VHi+VLi)/2.$$

In FIG. 7C, the transition voltage threshold $V_{UV}$ is increased to the $N^{th}$ voltage region RGN by adjusting the ratio of the first resistor R1 to the second resistor R2. At the moment t6, the sense voltage $V_{SEN}$ drops to the reference voltage $V_{REF}$, so the mode signal PF transits from the first state to the second state and the bi-directional converter 12 transits from the storage mode to the release mode for providing the release voltage $V_{SUP}$. The bus voltage $V_{BUS}$ at the moment t6 is the transition voltage threshold $V_{UV}$, so the transition voltage threshold $V_{UV}$ in FIG. 7C is increased to the $N^{th}$ voltage region RGN, the high side control signal VH equals the $N^{th}$ high side value VHN, and the low side control signal VL equals the $N^{th}$ low side value VLN. The release voltage $V_{SUP}$ equals the average value of the high side control signal VH and the low side control signal VL, i.e., $V_{SUP}=(VH+VL)/2=(VHN+VLN)/2$.

In the exemplary embodiment of FIG. 7A-FIG. 7C, when the transition voltage threshold $V_{UV}$ increases, the release voltage $V_{SUP}$ increases. In other embodiments, when the transition voltage threshold $V_{UV}$ increases, the release voltage $V_{SUP}$ may decrease.

Figure 8:
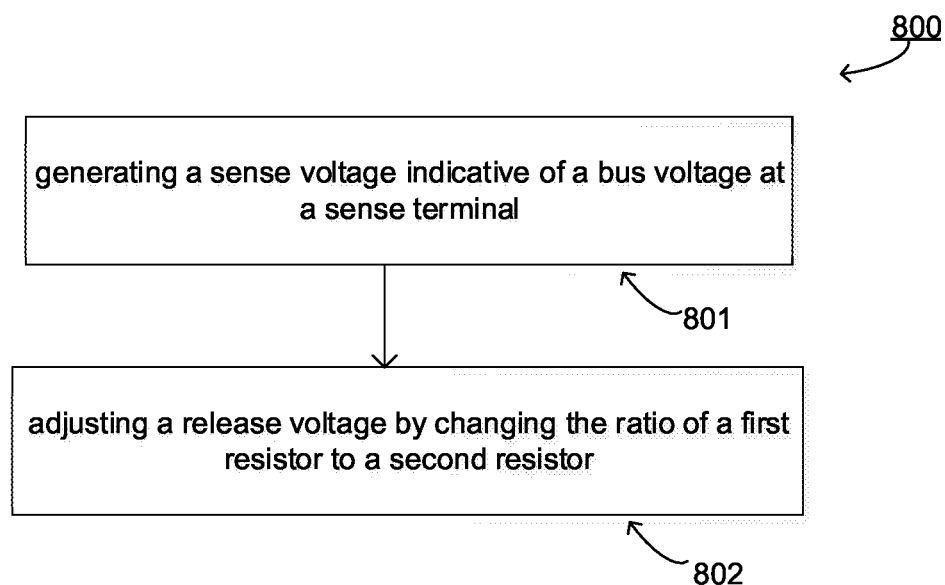
FIG. 8 illustrates a method 800 of adjusting a release voltage $V_{SUP}$ of a power system in accordance with an embodiment of the present invention.

FIG. 8 illustrates a method 800 of adjusting a release voltage $V_{SUP}$ of a power system in accordance with an embodiment of the present invention. The method 800 will be illustrated with reference to the power system 100 for better understanding. The power system 100 has the power input terminal IN to receive the bus voltage $V_{BUS}$, the first resistor R1 coupled between the power input terminal IN and the sense terminal SEN, the second resistor R2 coupled between the sense terminal SEN and the reference ground GND, and the bi-directional converter 12. The bi-directional converter 12 has the first terminal 111 coupled to the power input terminal IN, and the second terminal 112. The method 800 may include step 801 and step 802. In step 801, generating the sense voltage $V_{SEN}$ indicative of the bus voltage $V_{BUS}$ at the sense terminal SEN. When the sense voltage $V_{SEN}$ is higher than the reference voltage $V_{REF}$, the bi-directional converter 12 works in the storage mode and converts the received bus voltage $V_{BUS}$ to the first voltage V1 to charge the storage capacitor $C_S$. When the sense voltage $V_{SEN}$ is lower than the reference voltage $V_{REF}$, the bi-directional converter 12 works in the release mode, the bi-directional converter 12 converts the first voltage V1 to the release voltage $V_{SUP}$. The bus voltage $V_{BUS}$ at the moment when the bi-directional converter 12 transits from the storage mode to the release mode is the transition voltage threshold $V_{UV}$. In step 802, adjusting the release voltage $V_{SUP}$ by changing the ratio of the first resistor R1 to the second resistor R2. In an embodiment, when the ratio of the first resistor R1 to the second resistor R2 increases, the release voltage $V_{SUP}$ increases. In another embodiment, when the ratio of the first resistor R1 to the second resistor R2 increases, the release voltage $V_{SUP}$ may decrease.

In an embodiment, the method 800 of adjusting the release voltage $V_{SUP}$ of a power system may comprise adjusting the release voltage $V_{SUP}$ by changing the transition voltage threshold $V_{UV}$. In an embodiment, the step of adjusting the release voltage $V_{SUP}$ by changing the transition voltage threshold $V_{UV}$ may comprise recording the transition voltage threshold $V_{UV}$, generating the transition voltage digital signal $D_{UV}$ based on the transition voltage threshold $V_{UV}$, generating the output control signal VO based on the transition voltage digital signal $D_{UV}$, and regulating the release voltage $V_{SUP}$ based on the output control signal VO. In other embodiment, the step of adjusting the release voltage $V_{SUP}$ by changing the transition voltage threshold $V_{UV}$ may comprise recording the transition voltage threshold $V_{UV}$, generating the transition voltage digital signal $D_{UV}$ based on the transition voltage threshold $V_{UV}$, generating the high side control signal VH and the low side control signal VL based on the transition voltage digital signal $D_{UV}$, and regulating the release voltage $V_{SUP}$ based on the high side control signal VH and the low side control signal VL. In an embodiment, the release voltage $V_{SUP}$ equals the average value of the high side control signal VH and the low side control signal VL.

In an embodiment, when the bi-directional converter 12 works in the storage mode, the first voltage V1 is lower than the bus voltage $V_{BUS}$, and when the bi-directional converter 12 works in the release mode, the release voltage $V_{SUP}$ is higher than the first voltage V1.

For the power system in accordance with various embodiments of the present invention, when the bus voltage $V_{BUS}$ is higher than the transition voltage threshold $V_{UV}$, the bus voltage $V_{BUS}$ is configured to power the bi-directional converter and the switching circuits in the power system, and when the bus voltage $V_{BUS}$ is lower than the transition voltage threshold $V_{UV}$, the bi-directional converter provides the release voltage $V_{SUP}$ to supply the switching circuits in the power system. For the power system of the present invention, the release voltage $V_{SUP}$ is adjusted by changing the ratio of the first resistor R1 to the second resistor R2, no need for an additional feedback pin or other communication pins, such as I2C, PBUS, thus at least one feedback pin is omitted, and the cost of the power system is decreased.

The advantages of the various embodiments of the present invention are not confined to those described above. These and other advantages of the various embodiments of the present invention will become more apparent upon reading the whole detailed descriptions and studying the various figures of the drawings.

From the foregoing, it will be appreciated that specific embodiments of the present invention have been described herein for purposes of illustration, but that various modifications may be made without deviating from the technology. Many of the elements of one embodiment may be combined with other embodiments in addition to or in lieu of the elements of the other embodiments. Accordingly, the present invention is not limited except as by the appended claims.

What is claimed is:

1. A power system, comprising:
   a power input terminal, configured to receive a bus voltage;
   a sense terminal, configured to receive a sense voltage indicative of the bus voltage; and
   a bi-directional converter, having a first terminal coupled to the power input terminal, and a second terminal;
   wherein when the sense voltage decreases to reach or to be lower than a reference voltage, the bi-directional converter is adapted to be configured to operate in a release mode to provide a release voltage at the first terminal, and wherein a voltage value of the bus voltage at a moment when the sense voltage decreases to reach the reference voltage is a transition voltage threshold, and wherein the release voltage varies when the transition voltage threshold varies.

2. The power system of claim 1, wherein the release voltage increases when the transition voltage threshold increases.

3. The power system of claim 1, wherein the release voltage decreases when the transition voltage threshold decreases.

4. The power system of claim 1, wherein the bi-directional converter operates as a boost converter in the release mode.

5. The power system of claim 1, wherein when the sense voltage increases to reach or to be higher than the reference voltage, the bi-directional converter is adapted to be configured to operate in a storage mode to provide a first voltage at the second terminal.

6. The power system of claim 5, wherein the bi-directional converter operates as a buck converter in the storage mode.

7. The power system of claim 5, wherein the first voltage is lower than the bus voltage, and wherein the release voltage is higher than the first voltage.

8. The power system of claim 1, further comprising:
   a feedback circuit, coupled to the power input terminal and the sense terminal, and configured to provide the sense voltage.

9. The power system of claim 8, wherein the transition voltage threshold is adjusted by the feedback circuit.

10. The power system of claim 1, further comprising:
    a first resistor, coupled between the power input terminal and the sense terminal; and
    a second resistor, coupled between the sense terminal and a reference ground; and
    wherein when a ratio of the first resistor to the second resistor varies, the transition voltage threshold varies.

11. The power system of claim 1, further comprising:
    a mode control circuit, configured to generate a mode signal based on the sense voltage and the reference voltage, wherein when the sense voltage decreases to reach or to be lower than the reference voltage, the mode signal is adapted to control the bi-directional converter to operate in the release mode.

12. The power system of claim 11, wherein when the sense voltage increases to reach or to be higher than the reference voltage, the mode signal is adapted to control the bi-directional converter to operate in a storage mode.

13. The power system of claim 1, further comprising:
    a release voltage setting circuit, configured to provide an output control signal for controlling the release voltage based on the transition voltage threshold and a plurality of predetermined voltage ranges; and wherein the output control signal has a predetermined control value corresponding to the transition voltage threshold falling in a corresponding one predetermined voltage range of the plurality of predetermined voltage ranges.

14. The power system of claim 1, further comprising:
    a release voltage setting circuit, configured to provide a first output control signal and a second output control signal for controlling the release voltage based on the transition voltage threshold and a plurality of predetermined voltage ranges; and
    wherein the first output control signal and the second output control signal respectively have a predetermined first control value and a predetermined second control value corresponding to the transition voltage threshold falling in a corresponding one predetermined voltage range of the plurality of predetermined voltage ranges.

15. The power system of claim 1, further comprising:
    a release voltage setting circuit, configured to have a plurality of predetermined voltage ranges and a corresponding plurality of control values wherein each one of the plurality of predetermined voltage ranges corresponds to a corresponding one of the plurality of control values; and
    wherein the release voltage setting circuit is further configured to sample the transition voltage threshold and to provide an output control signal having the corresponding one control value which corresponds to the one predetermined voltage range in which the transition voltage threshold falls, and wherein the output control signal is used to control the release voltage.

16. The power system of claim 1, further comprising:
    a release voltage setting circuit, configured to have a plurality of predetermined voltage ranges and a corresponding plurality of first control values and a corresponding plurality of second control values wherein each one of the plurality of predetermined voltage ranges corresponds to a corresponding one first control value of the plurality of first control values and a corresponding one second control value of the plurality of second control values; and
    wherein the release voltage setting circuit is further configured to sample the transition voltage threshold and to provide a first output control signal and a second output control signal respectively having the corresponding one first control value and the corresponding one second control value which correspond to the one predetermined voltage range in which the transition voltage threshold falls; and
    wherein the first output control signal and the second output control signal are respectively used to control a peak value and a valley value of the release voltage.

17. The power system of claim 1, further comprising a release voltage setting circuit, wherein the release voltage setting circuit comprises:
    a threshold recording circuit, configured to sample the transition voltage threshold at the moment when the sense voltage is decreased to reach the reference voltage;
    a coding circuit, configured to generate a transition voltage digital signal based on the transition voltage threshold; and
    a decoding circuit, configured to generate a first control signal and a second control signal to control the release voltage based on the transition voltage digital signal.

18. The power system of claim 1, further comprising a release voltage setting circuit, wherein the release voltage setting circuit comprises:

a threshold recording circuit, configured to sample the transition voltage threshold at the moment when the sense voltage is decreased to reach the reference voltage; and a decoding circuit, configured to generate a control signal having a control value for controlling the release voltage based on the transition voltage threshold falling in a corresponding one predetermined voltage range.

19. The power system of claim 1, further comprising a release voltage setting circuit, wherein the release voltage setting circuit comprises:

a threshold recording circuit, configured to sample the transition voltage threshold at the moment when the sense voltage is decreased to reach the reference voltage; and a decoding circuit, configured to generate a first control signal and a second control signal respectively having a first control value and a second control value for controlling the release voltage based on the transition voltage threshold falling in a corresponding one predetermined voltage range.

20. The power system of claim 18, wherein the threshold recording circuit is configured to sample the transition voltage threshold either in analog voltage data format or in digital voltage data format.

21. The power system of claim 20, wherein if the transition voltage threshold is sampled in analog voltage data format, the release voltage setting circuit further includes an analog to digital conversion circuit configured to translate the transition voltage threshold in analog voltage data format to the transition voltage threshold in digital voltage data format.

22. The power system of claim 16, wherein the release voltage equals an average value of the first output control signal and the second output control signal.

23. The power system of claim 16, wherein the plurality of first control values are equal to each other while the plurality of second control values are different from each other.

24. The power system of claim 16, wherein the plurality of first control values are different from each other while the plurality of second control values are equal to each other.

25. A power system, comprising:

a power input terminal, configured to receive a bus voltage;

a sense terminal, configured to receive a sense voltage indicative of the bus voltage; and a bi-directional converter, having a first terminal coupled to the power input terminal, and a second terminal, wherein when the sense voltage decreases to reach or to be lower than a reference voltage, the bi-directional converter is adapted to be configured to operate in a release mode to provide a release voltage at the first terminal;

and wherein the bus voltage at a moment when the bi-directional converter enters the release mode is a transition voltage threshold, and wherein when the transition voltage threshold varies, the release voltage varies.

26. The power system of claim 25, wherein when the transition voltage threshold increases, the release voltage increases.

27. The power system of claim 25, wherein when the transition voltage threshold decreases, the release voltage decreases.

* * * * *